April 22, 1941.  E. W. CARROLL  2,238,970
METHOD AND APPARATUS FOR ORIENTATING, PITTING, AND INSPECTING CHERRIES
Filed Aug. 21, 1939
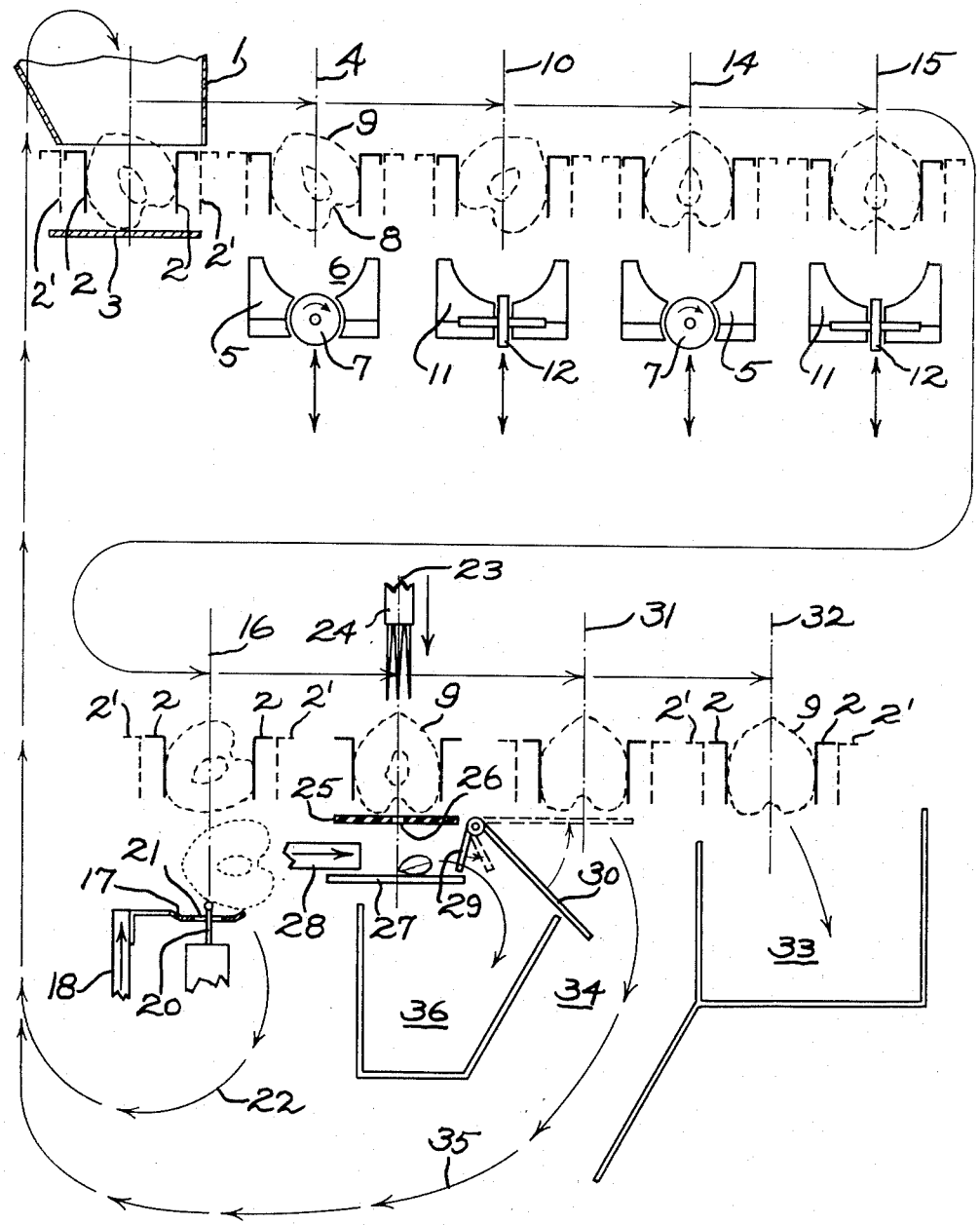
INVENTOR,
ELLSWORTH W. CARROLL.
BY
Lippincott & Metcalf
ATTORNEYS.

Patented Apr. 22, 1941

2,238,970

UNITED STATES PATENT OFFICE 2,238,970

METHOD AND APPARATUS FOR ORIENTATING, PITTING, AND INSPECTING CHERRIES

Ellsworth W. Carroll, San Francisco, Calif., assignor to S & W Fine Foods, Inc., San Francisco, Calif., a corporation of California Application August 21, 1939, Serial No. 291,136

11 Claims. (Cl. 146—19)

My invention relates to full automatic devices for handling fruit, and more particularly to a fully automatic device which will orientate, pit, and inspect the fruit operated on for the presence of pit.

My device operates by making use of the presence of a dimple or stem indent of the fruit, and consequently is ideally adapted for the handling of cherries inasmuch as cherries have a well defined indent useful in practicing my method.

In packing of cherries for sale to the public, cherries having pits removed through the axis of the fruit passing through the stem indent, the pit and the opposite end of the fruit, command premium prices over cherries which are pitted along indescriminate axes.

Heretofore, it has been the practice in pitting such orientated fruit to feed the fruit beneath a pitting knife with the desired pitting axis alined with the axis of the knife. These axes are usually vertical. This alinement is customarily made by hand, the operator picking up each cherry separately, turning it and placing it beneath the pitting knife with the dimple down. Such a feeding operation is slow and greatly reduces the output of a pitting machine. Thus, fruit pitted along a predetermined axis is always higher in production cost than fruit which is pitted along heterogeneous axes as it might be presented to the knives in bulk.

Furthermore, hand orientating and hand feeding of the orientated fruit to the pitter causes many of the cherries to pass through the pitting stage with their pits still in the cherry, and it has been found that even with the greatest of care and personal inspection of the fruit output, there is still a small percentage of unpitted fruit passing into the finished product. Obviously, the presence of pits, even in small number, in a product presented to the public as a pitted product, is a great disadvantage.

It is therefore the main object of my invention to provide a means and method of automatically and mechanically orientating a fruit having a stem indent, so that said fruit may be pitted while held in an orientated position, and thereafter to automatically and mechanically inspect said fruit to insure the fact that there shall be no fruits having the pits remaining therein in the final output flow.

It is also an object of my invention to solve this problem in two distinct ways; first, by automatically orientating the cherry to as nearly exact a position in line with the axis of the pitting knife as is possible, thereby preventing the missing of pits by the knife, and second, to utilize the pit as a means of positively inspecting and dividing the fruit passing through the pitting stage into the pitted and unpitted fruit.

The present application provides a full automatic means and method of handling cherries from the bulk feeding of the cherries through orientation stages through a pitting stage, and through an inspection and grouping stage. This application is a continuation-in-part of my prior application, Serial No. 211,140, filed June 1, 1938, wherein I have described and claimed certain orientation devices per se utilized herein, and utilizes the invention of application Serial No. 304,110, filed November 13, 1939, which is a division of the first cited application, describing and claiming a position inspector for determining the proper positioning of the fruit before it reaches the pitting knife, and further embodies the invention of Serial No. 292,431, filed August 29, 1939, relating to the inspection of fruit after pitting by utilizing the pit. The present application deals solely with a combination of the various orientating and inspecting devices and manipulative steps set forth in the above-identified applications, and this combination is herein separately described and claimed inasmuch as each of the inventions referred to in the applications above-referred to has many other uses apart from the system described and claimed herein.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

Referring to the drawing, which is a diagrammatic step by step representation of one preferred means of performing my method of handling cherries in a fully automatic device, bulk cherries, preferably of the type known in the trade as stemmed, brined, cherries, are fed into hopper 1. Brined cherries have been pickled or preserved in brine comprising, such as, for example, an aqueous solution of sulphur dioxide and lime water. A series of fruit clamps comprising opposed clamp arms 2 are then progressed serially beneath the hopper 1 and over retaining plate 3, and the clamps in this position and in each of the following positions stop and are opened by divergence in the horizontal plane, as indicated by the dotted lines 2', throughout the remainder of the stages, with the exception of the pitting stage, as will be described later. Mechanism to convey and to open and close the clamp arms will be obvious to those skilled in the art. Fruit from hopper 1 drops in between the open clamp arms 2, and these clamp arms then close to grip the cherries in heterogeneous positions, the position at this stage being wholly unimportant. This stage may be called the loading stage.

The gripped fruit is then progressed to and stopped at a first orientation stage, as indicated by broken line 4. Immediately beneath stage 4, or first orientation stage, is first orientation cup 5 comprising a concave cup containing a recess 6, having projecting into the bottom thereof a rotating first orientation wheel 7. Wheel 7 is of such a size that it projects only slightly into the recess 6 and therefore will contact the surface of any cherry deposited into the recess in any position except the position when the stem indent 8 of a cherry 9 is down. The wheel is also of a size related to the smaller stem indents of the cherry grade being handled, such that when the stem indent of a fruit registers with the wheel no contact with the wheel will be made. If desired, these wheels may be gear wheels and driven from driving gears positioned below the cup.

Normally, cup 5 and wheel 7 are maintained well below clamp arms 2 so that the clamps may progress, but after the clamp arms with the clamped cherry therebetween have stopped in the position of stage 4, the orientation cup 5 is raised to a point immediately beneath the clamp arms 2 and cherry 9. At this time the clamp arms are opened, dropping the cherry into the cup. Wheel 7 in this position then rotates one or more revolutions, preferably about one and one-eighth revolutions, and thus revolves the cherry in the plane determined by the plane of the wheel 7. If, during the course of this revolution, the stem indent registers with the wheel, no further revolution of the cherry will take place because the wheel will revolve in the stem indent without contact with the surface of the cherry. After the predetermined number of revolutions of the wheel has taken place, however, and whether or not the stem indent has registered with the wheel, clamp arms 2 are again moved towards each other to again clamp the fruit, first orientation cup 5 drops out of the way of the progressing clamp, and the clamp and cherry are moved to a second orientation stage 10, as is shown by the broken line 10. Beneath the stage 10 is a second orientation cup 11 having a second orientation wheel 12 positioned in the bottom thereof as in the first orientation stage, except that the second orientation wheel 12 is preferably positioned at right angles to the plane of rotation of first orientation wheel 17. The same procedure occurs here as in the first orientation stage; namely, the second orientation cup is raised beneath the cherry held in the second orientation stage, the fruit is released to drop in the cup, the fruit is then rotated in a different plane than in the first orientation stage, and is again picked up.

It is to be noted that if, in this second stage, the fruit is dropped in the orientation cup 11 with the dimple down, the fruit having been orientated already by the first stage, then no further rotation of the fruit will take place in this stage as the wheel will not contact the cherry, and the fruit will be picked up in the desired orientated position. All other fruit is rotated, and fruit which has passed through the first stage without becoming orientated with the stem indent down may, in the second stage, become orientated, or may not be.

I then progress the fruit to a third stage, as indicated by broken line 14, having a cup similar to that of the first orientation stage with the wheel rotating in the same plane as in the first cup. Then from the third stage I pass the cherry to a fourth stage, as indicated by the dotted line 15, which has a cup and orientating wheel exactly similar to that of the second stage heretofore described.

In case orientation occurs in any of the four stages it will be obvious that the fruit is passed along to the following stages in the proper orientated position, and that the fruit will not be thereafter rotated by these following stages, but is simply dropped and picked up in the proper orientated position. I have found, however, that practically one hundred per cent of the fruit will become fully orientated after passing through the four stages as described and shown, and that it is not necessary for full commercial operation of the device to utilize over four stages. As a matter of fact, the greater majority of the cherries are fully orientated before they arrive at the fourth stage, and the fourth stage simply has to take care of such few fruits as might have accidently missed orientation in the prior stages.

The fruit, therefore, passing out of the fourth stage 15 may be said to have all but an occasional unit in the properly orientated position, but it is desirable that even these few units do not reach the pitting knife. Consequently, I provide a position inspecting stage as a fifth stage, indicated by broken line 16, and this stage is so constructed as to eliminate from the cherries passing through to the pitter, all of those fruits which are not positioned with the dimple down. This is accomplished by stopping the fruit in the inspection position, as indicated by the broken line 16, and then raising beneath the fruit a shallow holding ring 17 operated by rod 18 in any convenient manner. This rod, however, makes two full strokes during the time that the fruit remains in position 16.

In the drawing I have illustrated the operation of the device in case a fruit leaving stage 15 has not been orientated. Ring 17 is raised beneath the clamp arms 2 and the clamp arms are then opened to the dotted line position 2'. Fruit is therefore dropped into and supported on the shallow depression of ring 17. The ring with the cherry upon it is then lowered to a predetermined position, as shown in the drawing, and in this position a reject pin 20 passes through the aperture 21 in the ring to a distance which is adjusted to coincide with the average minimum dimple depth of the grade of cherries being handled. Obviously, if the dimple is down, pin 20 will not disturb the support of cherry on ring 17, because it enters the stem indent of the cherry. If, however, the cherry has been deposited on the ring so that the stem indent is not down, then the pin 20 will contact the convex surface of the cherry and cause the cherry to roll off the ring 17.

Thus, when ring 17 returns to a point beneath clamp 2 in stage 16 on its second stroke after the cherry has been rolled off, the clamp arms will close but will not contain any cherry to convey to the following pitting stage. The cherries which have been rolled off from ring 17 are then returned to the feeding hopper 1, as indicated by arrow line 22, for further treatment, and reorientation. The empty clamp will then follow through the remaining sequences of the clamp progression without interference with preceding or following occupied clamps. If the ring returns a properly orientated fruit to the clamp it will be transported to the next, or pitting stage, as indicated by broken line 23, and here the clamp arms 2 stop with the cherry directly beneath a pitting knife 24, preferably of the type formed from parallel needles arranged around a circle slightly greater than the average diameter of a cherry pit. The clamps, however, in this position, do not open and the knife is moved downwardly through the pointed end of the cherry to engage the pit and to push the pit through the stem indent, and through a flexible base plate 25 having a center aperture 26, preferably smaller than the pit. The knife and pit both are pushed through the aperture, the pit acting as a pilot for the knife, spreading the aperture in the rubber. The pit is removed from the knife by the resiliency of the aperture edges, and is deposited on stationary pit receiving plate 27 positioned beneath space plates 25. A pit plunger 28 is then passed between pit plate 27 and base plate 25, pushing the pit ahead of it against a short arm 29 of a pivoted inspection flap 30.

In the meantime, the clamp with the pitted cherry has progressed to a pit inspection stage, as indicated by broken line 31, and the clamp arms are again opened at this stage.

If the pit of the cherry is present in front of plunger 28, push of the plunger 28 against the pit will move the flap 30 up to a point directly beneath the clamp. As the clamp opens flap 30 therefore will support the cherry up to the time the clamp closes, and the cherry will then be carried on to a discharge stage, as indicated by the dotted line 32, where the clamp will open to discharge the cherry in pitted fruit discharge chute 33. If the pit of the cherry has been missed by the pitting knife, and the cherry in stage 31 still has the pit in it, then as plunger 28 moves forward, the flap 30 cannot be moved to a position beneath the clamp in the inspection stage 31, and the cherry therefore will not be supported by the flap when the clamp arms open, but will fall in unpitted fruit discharge chute 34 to be returned to hopper 1, as indicated by arrow line 35. The pits, after having been used to move flap 30, fall into a pit receiver 36.

Thus, it will be seen that I have provided a fully automatic and continuous means and method of orientating a fruit with relation to the stem indent or dimple, inspecting the fruit to make sure that the stem indent is in the desired position, and discarding for reorientation all fruits not properly orientated at this point. Orientated cherries only are passed to the pitter, and the removed pit is then utilized to cause the pitted fruit to pass into the output chute where the cherries may be further processed and packed for presentation to the public. Such fruits as still have the pit remaining therein are automatically returned to the original feed hopper for reorientation and repitting.

It will be noticed that while I have described my device by following a single clamp through the entire series of operation, that a succession of clamps are utilized, each passing through the various stages of the device. Thus, the mechanical motions of the apparatus are greatly simplified in that all of the orientation cups, for example, may be moved upwardly and downwardly in unison, and the interlinkage of inspection ring 17 has only to be in double time relation to the movement of the orientation cups.

Likewise, the motion of plunger 28 in the pit inspecting mechanism and that of the pitting knife are definitely inter-related with the motion of the orientation cups and the inspection ring. Thus, the entire synchronization of the various moving parts is relatively simple and will be easily apparent to those skilled in the art.

I claim:

1. The method of operating on substantially spherical indented fruit to produce only fruit pitted through a predetermined axis and free from pits, which comprises subjecting unpitted fruit in heterogeneous positions to positive rotational forces tending to orientate improperly positioned fruit, holding the fruit in the positions attained as a result of the action of said forces, mechanically sensing the stem indent position of said fruit as held to cause automatic release of improperly orientated fruit, pitting the remaining properly orientated fruit in orientated position, holding the fruit in orientated position after pitting, and mechanically inspecting said fruit for pits without disturbing the orientation of properly pitted fruit.

2. The method of operating on substantially spherical indented fruit to produce only fruit pitted through a predetermined axis and free from pits, which comprises subjecting unpitted fruit in heterogeneous positions to positive rotational forces tending to orientate improperly positioned fruit, holding the fruit in the positions attained as a result of the action of said forces, utilizing the stem indent contour of said fruit as held to cause mechanical and automatic release of improperly orientated fruit, pitting the remaining properly orientated fruit in orientated position, holding the fruit in orientated position after pitting, mechanically inspecting said fruit for pits without disturbing the orientation of properly pitted fruit, and removing properly pitted fruit after such mechanical inspection still in orientated position.

3. The method of operating on substantially spherical indented fruit to produce only fruit pitted through a predetermined axis and free from pits, which comprises subjecting unpitted fruit in heterogeneous positions to positive rotational forces tending to orientate improperly positioned fruit, holding the fruit in the positions attained as a result of the action of said forces, utilizing the stem indent contour of said fruit as held to cause mechanical and automatic release of improperly orientated fruit, pitting the remaining properly orientated fruit in orientated position, holding the fruit in orientated position after pitting, mechanically inspecting said fruit for pits without disturbing the orientation of properly pitted fruit, reorientating improperly pitted fruit, and repitting the reorientated fruit.

4. The method of operating on substantially spherical indented fruit to produce only fruit pitted through a predetermined axis and free from pits, which comprises supplying a flow of fruit in hetergeneous positions, applying positive rotational forces to the improperly orientated fruit in said flow, mechanically selecting from said flow at a predetermined point such fruit as are properly orientated, mechanically returning improperly orientated fruit to the beginning of said flow, and pitting the orientated fruit selected in orientated position.

5. The method of operating on substantially spherical indented fruit to produce only fruit pitted through a predetermined axis and free from pits, which comprises supplying a flow of fruit in heterogeneous positions, applying positive rotational forces to the improperly orientated fruit in said flow, mechanically selecting from said flow at a predetermined point such fruit as are properly orientated, mechanically returning improperly orientated fruit to the beginning of said flow, subjecting the selected fruit to a pitting operation while in orientated position, mechanically inspecting the fruit thereafter for pits, and mechanically returning improperly pitted fruit to the beginning of said flow for reorientation and repitting.

6. The method of handling fruit such as cherries in successive stages, which comprises rotating said fruit in a plurality of planes, controlling the cessation of rotation by the position of the stem indent of the fruit, mechanically inspecting said fruit for position of said stem indent, mechanically discarding fruit having the stem indent in undesired positions in accordance with said automatic inspection, without disturbing properly orientated fruit, and mechanically inspecting the fruit for the presence or absence of a pit therein while in the same position.

7. The method of handling fruit, which comprises subjecting said fruit to a positive orientation revolution tending to leave said fruit with the stem indent in a predetermined position, mechanically rejecting fruits having stem indents in other positions, subjecting said fruits to a pitting operation while in orientated position and mechanically rejecting fruits having pits therein without disturbing properly pitted fruit.

8. In a fruit handling machine the combination of means for continuously progressing fruit such as cherries through the following stages in succession:

Stage 1 comprising means for rotating a cherry in a predetermined plane;

Stage 2 comprising means for rotating fruit in another plane, each of Stages 1 and 2 including means for causing cessation of rotation when said stem indent reaches a predetermined position;

Stage 3 comprising automatic means for rejecting improperly orientated fruit while held with said indent in said predetermined position;

Stage 4 comprising means for subjecting the properly orientated fruit in orientated position to the action of a pitting knife;

Stage 5 comprising automatic means for rejecting improperly pitted fruit without disturbing properly orientated fruit.

9. In a fruit handling machine the combination of means for continuously progressing fruit such as cherries in a substantial horizontal path through the following stages in succession while being supported against gravity:

Stage 1 comprising means for rotating fruit in vertical planes, said means including means for causing cessation of rotation when said stem indent reaches a predetermined position;

Stage 2 comprising automatic means for withdrawing gravity support from only the properly orientated fruit having stem indents in other than said predetermined position;

Stage 3 comprising means for subjecting the remaining properly orientated fruit in orientated position to the action of a pitting knife;

Stage 4 comprising mechanical sorting means for rejecting improperly pitted fruit without disturbing the position of properly pitted fruit.

10. In a fruit handling machine the combination of means for continuously progressing fruit such as cherries in a substantial horizontal path through the following stages in succession while being supported against gravity:

Stage 1 comprising means for rotating fruit in vertical planes, said means including means for causing cessation of rotation when said stem indent reaches a predetermined position;

Stage 2 comprising automatic means for withdrawing gravity support from only the improperly orientated fruit having stem indents in other than said predetermined position;

Stage 3 comprising means for subjecting the remaining properly orientated fruit in orientated position to the action of a pitting knife;

Stage 4 comprising mechanical sorting means operating to withdraw gravity support from all fruit from which a pit was not ejected without disturbing the position of properly pitted fruit.

11. In a fruit handling machine the combination of means for continuously progressing fruit such as cherries in a substantial horizontal path through the following stages in succession while being supported against gravity:

Stage 1 comprising means for rotating fruit in vertical planes, said means including means for causing cessation of rotation when said stem indent reaches a predetermined position;

Stage 2 comprising automatic means for withdrawing gravity support from only the improperly orientated fruit having stem indents in other than said predetermined position;

Stage 3 comprising means for subjecting the remaining properly orientated fruit in orientated position to the action of a pitting knife;

Stage 4 comprising mechanical sorting means operating to withdraw gravity support from all fruit from which a pit was not ejected, and only such latter fruit.

ELLSWORTH W. CARROLL.